(12) United States Patent
Nishi

(10) Patent No.: US 10,469,703 B2
(45) Date of Patent: Nov. 5, 2019

(54) TANDEM TYPE IMAGE FORMING APPARATUS, METHOD FOR CONTROLLING THE SAME, AND IMAGE FORMING SYSTEM

(71) Applicant: Konica Minolta, Inc., Tokyo (JP)

(72) Inventor: Youichirou Nishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 75 days.

(21) Appl. No.: 15/692,749

(22) Filed: Aug. 31, 2017

(65) Prior Publication Data

US 2018/0077314 A1 Mar. 15, 2018

(30) Foreign Application Priority Data

Sep. 13, 2016 (JP) ................................ 2016-178567

(51) Int. Cl.
*H04N 1/32* (2006.01)
*G06K 15/02* (2006.01)

(52) U.S. Cl.
CPC ....... *H04N 1/32545* (2013.01); *G06K 15/186* (2013.01); *G06K 15/1823* (2013.01); *G06K 15/1818* (2013.01); *H04N 2201/3288* (2013.01)

(58) Field of Classification Search
CPC .............................................. H04N 1/32545
USPC ...................................................... 399/388
See application file for complete search history.

(56) References Cited

U.S. PATENT DOCUMENTS

| 5,056,771 | A | * | 10/1991 | Beck | ........................ | B65H 7/18 |
| | | | | | | 271/10.03 |
| 5,692,742 | A | * | 12/1997 | Tranquilla | ............... | B65H 5/34 |
| | | | | | | 271/10.03 |
| 5,964,460 | A | * | 10/1999 | Azumi | .................. | B65H 3/0661 |
| | | | | | | 271/258.01 |
| 6,702,274 | B1 | * | 3/2004 | Otsuka | ................. | B41J 13/0009 |
| | | | | | | 271/10.01 |
| 7,907,880 | B2 | * | 3/2011 | Muroi | ................ | G03G 15/0131 |
| | | | | | | 347/116 |
| 8,070,152 | B2 | * | 12/2011 | Miwa | ................... | B65H 3/0684 |
| | | | | | | 271/10.03 |
| 8,977,167 | B2 | * | 3/2015 | Seki | .................... | G03G 15/0131 |
| | | | | | | 399/16 |
| 2003/0161649 | A1 | * | 8/2003 | Yoshikawa | ........ | G03G 15/1605 |
| | | | | | | 399/68 |

(Continued)

FOREIGN PATENT DOCUMENTS

JP 2005200133 A 7/2005

*Primary Examiner* — Anthony H Nguyen
(74) *Attorney, Agent, or Firm* — Lucas & Mercanti, LLP

(57) ABSTRACT

A tandem type image forming system includes a first image forming apparatus, and a second image forming apparatus connected in series to the first image forming apparatus and located on a downstream side in a sheet conveyance direction with respect to the first image forming apparatus. The tandem type image forming system has a controller which shortens a second sheet interval when conveying a plurality of consecutive sheets from the first image forming apparatus to the second image forming apparatus than a first sheet interval when conveying the plurality of consecutive sheets from the second image forming apparatus to a post processing apparatus connected to the second image forming apparatus.

14 Claims, 5 Drawing Sheets

(56) References Cited

U.S. PATENT DOCUMENTS

2007/0217796 A1* 9/2007 German ............ G03G 15/5062
  399/9
2008/0034996 A1* 2/2008 Yamamoto ........... G03G 15/652
  101/225

* cited by examiner

TANDEM TYPE IMAGE FORMING APPARATUS, METHOD FOR CONTROLLING THE SAME, AND IMAGE FORMING SYSTEM

CROSS-REFERENCE TO RELATED APPLICATION

Japanese Patent Application No. 2016-178567 filed on Sep. 13, 2016, including description, claims, drawings, and abstract, the entire disclosure is incorporated herein by reference in its entirety.

BACKGROUND

1. Technological Field

The present invention relates to a tandem type image forming apparatus, a method for controlling the tandem type image forming apparatus, and an image forming system.

2. Description of the Related Art

In recent years, in the field of production print (hereafter, also written as "PP"), techniques to make print processing into high speed and high efficiency have been developed. As one of the techniques to make print processing into high speed and high efficiency, a tandem type image forming apparatus in which two image forming apparatuses each operable as a single unit are connected in series, has been known generally. In the present specification, in the tandem type image forming apparatus, an image forming apparatus located on the upstream side in the paper sheet conveyance direction is referred to as an "upstream machine", and an image forming apparatus located on the downstream side is referred to as a "downstream machine".

In the field of the PP, to the tandem type image forming apparatus, a paper sheet feeding apparatus capable of feeding a large amount of paper sheets (hereinafter, "paper sheet" is merely referred to as "sheet") and a post processing apparatus to execute post processing for sheets on which images have been formed, are connected so as to constitute an "image forming system", and the image forming system supports commercial printing required to perform a large amount of print processing in a short time.

In the image forming system, in order to make print processing into high speed and high efficiency, it is desired to shorten an interval between sheets conveyed through the upstream machine, the downstream machine, and the post processing apparatus as much as possible. However, on the other hand, in the post processing apparatus, there is a need to convey sheets with a certain sheet interval to which processing time for post processing is considered.

In the conventional image forming system, a downstream machine is constituted such that an interval between sheets to be conveyed to a post processing apparatus becomes constant. In connection with this, Japanese Patent Application Laid-Open No. 2005-200133 discloses a technique to convey out sheets with a fixed sheet interval from a sheet feeding apparatus.

However, in the above-mentioned conventional image forming system, in a section from an upstream machine to a downstream machine, in the case where a delay occurs in sheet conveyance due to a slip of a sheet, etc., it is impossible to get back the delay unless a mechanism to get back the delay is disposed in the above section. Since an interval between sheets to be conveyed from a downstream machine to a post processing apparatus needs to be maintained at a fixed interval, in the case where the arrival of a sheet at the downstream machine has been delayed, with this delay, the start of sheet conveyance from the downstream machine to the post processing apparatus is also delayed. Therefore, in the case where the delay of sheet conveyance continues, the delay times are accumulated, and there is a problem that the productivity of print processing is lowered. Furthermore, in the case where the delay times are accumulated more than a certain amount, there is a problem that there is fear that sheet jams may occur due to collision of sheets, etc.

SUMMARY

The present invention has been achieved in view of the above-described problems. Therefore, an object of the present invention is to provide a tandem type image forming apparatus that prevents the lowering of the productivity of print processing and the occurrence of sheet jams, a method for controlling the tandem type image forming apparatus, and an image forming system.

To achieve at least one of the above-mentioned objects, according to an aspect of the present invention, a tandem type image forming system reflecting one aspect of the present invention comprises a first image forming apparatus and a second image forming apparatus connected in series to the first image forming apparatus and located on a downstream side in a sheet conveyance direction with respect to the first image forming apparatus, wherein the tandem type image forming system has a controller which shortens a second sheet interval when conveying a plurality of consecutive sheets from the first image forming apparatus to the second image forming apparatus than a first sheet interval when conveying the plurality of consecutive sheets from the second image forming apparatus to a post processing apparatus connected to the second image forming apparatus.

To achieve at least one of the above-mentioned objects, according to an aspect of the present invention, a control method reflecting one aspect of the present invention for controlling a tandem type image forming system that includes a first image forming apparatus and a second image forming apparatus connected in series to the first image forming apparatus and located on a downstream side in a sheet conveyance direction with respect to the first image forming apparatus, the control method comprises: conveying a sheet from the first image forming apparatus to the second image forming apparatus and conveying the sheet from the second image forming apparatus to a post processing apparatus connected to the second image forming apparatus, wherein the tandem type image forming system shortens a second sheet interval when conveying a plurality of consecutive sheets from the first image forming apparatus to the second image forming apparatus than a first sheet interval when conveying the plurality of consecutive sheets from the second image forming apparatus to the post processing apparatus.

To achieve at least one of the above-mentioned objects, according to an aspect of the present invention, a tandem type image forming system comprising: a first image forming apparatus, a second image forming apparatus connected in series to the first image forming apparatus and located on a downstream side in a sheet conveyance direction with respect to the first image forming apparatus, and a post processing apparatus located on a downstream side in a sheet conveyance direction with respect to the second image forming apparatus, wherein the tandem type image forming system has a controller which shortens a second sheet interval when conveying a plurality of consecutive sheets from the first image forming apparatus to the second image forming apparatus than a first sheet interval when conveying the plurality of consecutive sheets from the second image forming apparatus to a post processing apparatus connected to the second image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
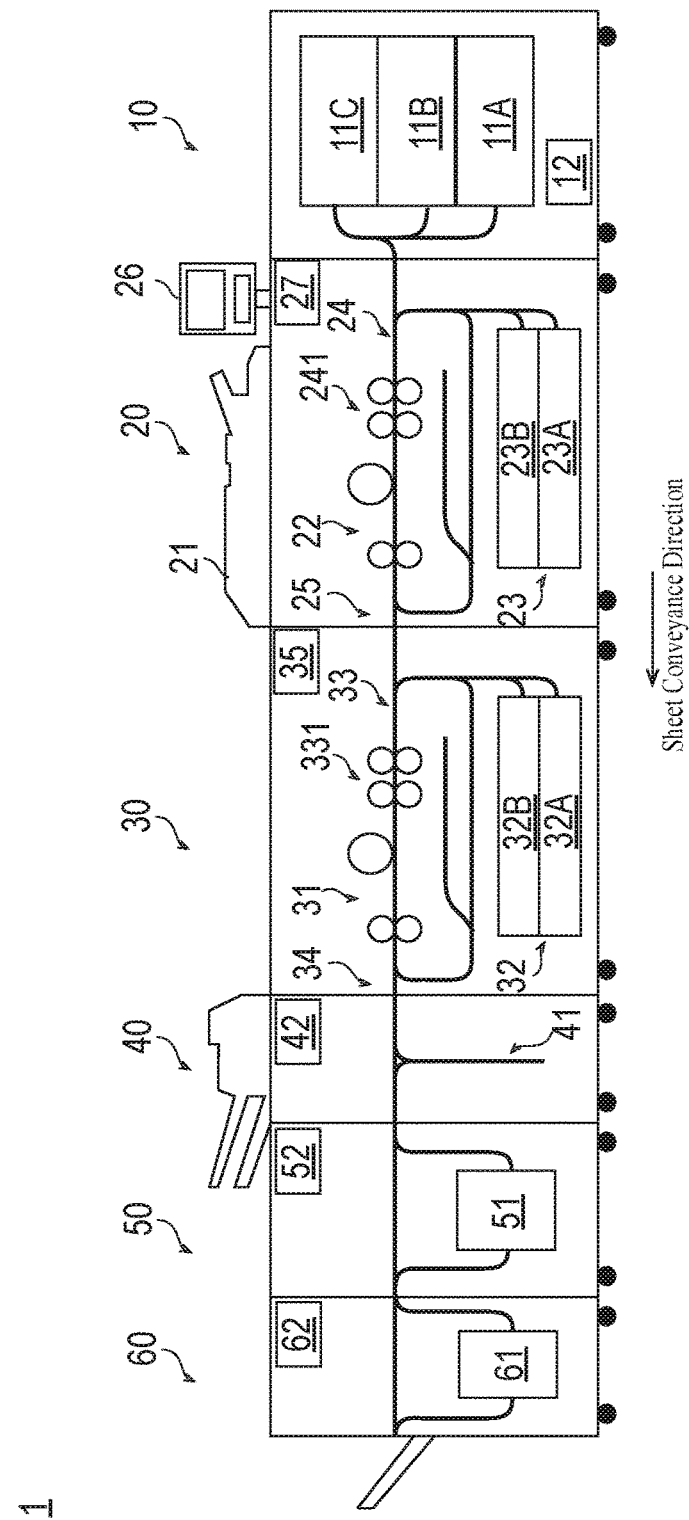
FIG. 1 is a schematic cross sectional view exemplifying a constitution of an image forming system according to one embodiment.

Hereinafter, one or more embodiments of the present invention will be described with reference to the drawings. However, the scope of the invention is not limited to the disclosed embodiments. In the drawings, the same reference signs are used for the same members. Furthermore, the dimensional ratios in the drawings are exaggerated on account of description, and may be different from actual ratios.

One Embodiment

Figure 2:
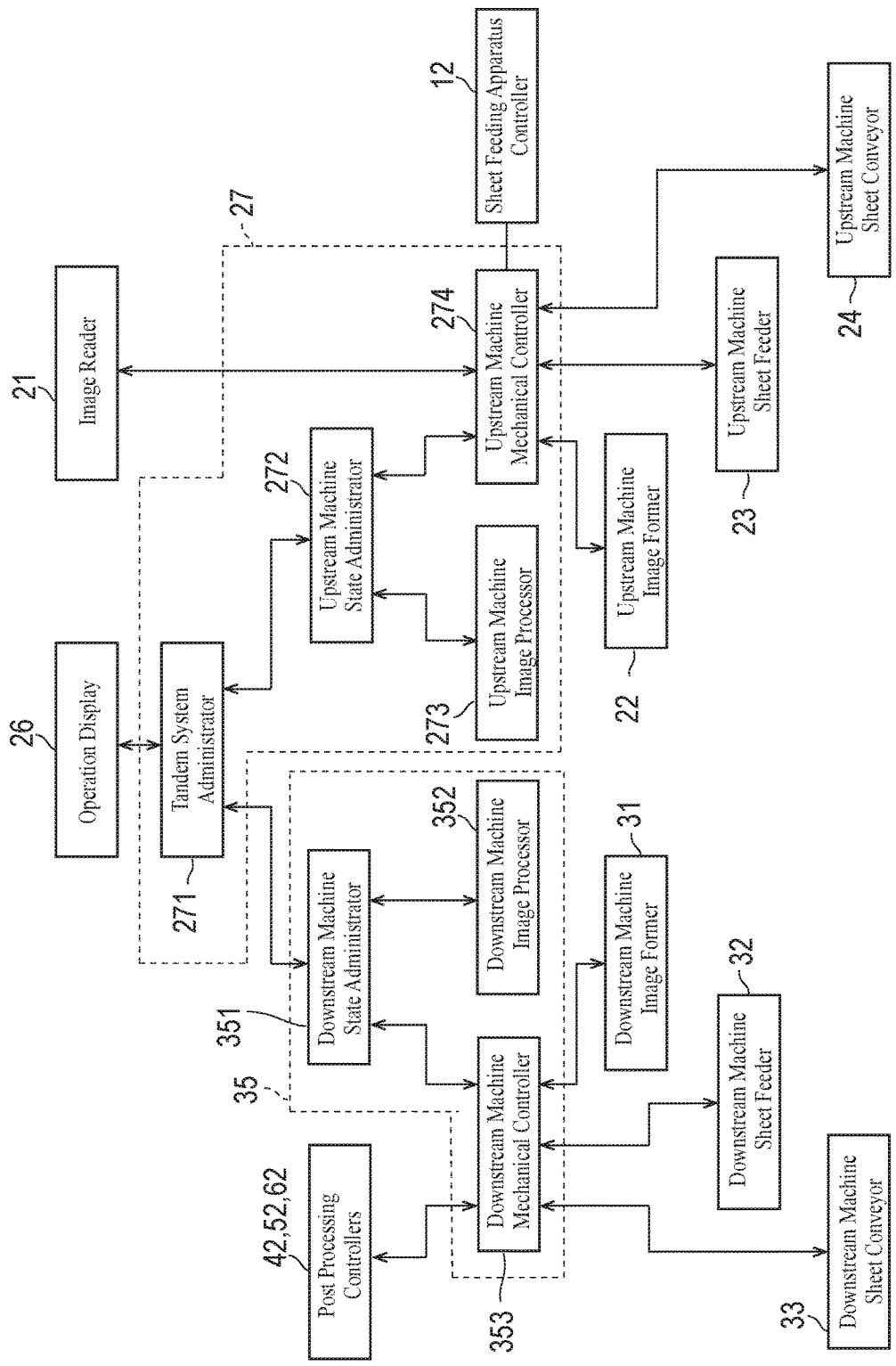
FIG. 2 is a schematic block diagram exemplifying a functional constitution of the image forming system shown in FIG. 1.

FIG. 1 is a schematic cross sectional view exemplifying a constitution of an image forming system according to one embodiment, and FIG. 2 is a schematic block diagram exemplifying a functional constitution of the image forming system shown in FIG. 1.

<Image Forming System 1>

As shown in FIG. 1, the image forming system 1 includes a sheet feeding apparatus 10, an upstream machine (a first image forming apparatus) 20, a downstream machine (a second image forming apparatus) 30, a first post processing apparatus 40, a second post processing apparatus 50, and a third post processing apparatus 60. These apparatuses are connected in series along a sheet conveyance direction. The upstream machine 20 and the downstream machine 30 operate as a tandem type image forming apparatus. The constitution of the image forming system 1 shown in FIG. 1 is one example, and the type and number of apparatuses included in the image forming system 1 are not limited to the example shown in FIG. 1.

<Sheet Feeding Apparatus 10>

The sheet feeding apparatus 10 feeds sheets as recording materials to the upstream machine 20 in response to the instructions of the upstream machine 20. The sheet feeding apparatus 10 includes a plurality of sheet feeding trays 11A to 11C and a sheet feeding apparatus controller 12, and stores multiple kinds of sheets different in size and thickness etc. in the sheet feeding trays 11A to 11C in large quantities. The sheet feeding apparatus controller 12 receives the instruction of the upstream machine 20, selects any one sheet feeding tray of the sheet feeding trays 11A to 11C, and feeds sheets to the upstream machine 20.

<Upstream Machine 20>

The upstream machine 20 includes an image reader 21, an upstream machine image former 22, an upstream machine sheet feeder 23, an upstream machine sheet conveyor 24, an upstream machine sheet discharger 25, an operation display 26, and an upstream machine controller 27, and functions as a first image forming apparatus. The upstream machine 20 is disposed between the sheet feeding apparatus 10 and the downstream machine 30.

The image reader 21 includes an optical system constituted by mirrors, lenses, and the like, and a reading sensor. The image reader 21 reads out documents placed on a reading plane or documents conveyed by an ADF (Auto Document Feeder), and outputs image signals.

The upstream machine image former 22 forms images on sheets based on print jobs received from client terminals etc. or the above-described image signals by using well-known image forming processes such as an electrophotographic process including electrically charging, image exposing, developing, transferring, and fixing.

The upstream machine sheet feeder 23 feeds sheets as recording materials. The upstream machine sheet feeder 23 includes a plurality of sheet trays 23A and 23B, and in each of the sheet trays, for example, sheets such as A4 size sheets and B5 size sheets are stored.

The upstream machine sheet conveyor 24 conveys sheets in the upstream machine 20. The upstream machine sheet conveyor 24 includes a sheet conveyance passage, a plurality of conveyance roller pairs disposed on the sheet conveyance passage, and a registrator 241.

The sheet conveyance passage includes a passage from an introduction port to introduce sheets from the sheet feeding apparatus 10 through the registrator 241 and the upstream machine image former 22 to the upstream machine sheet discharger 25, a passage from the upstream machine sheet feeder 23 through the registrator 241 and the upstream machine image former 22 to the upstream machine sheet discharger 25, and a passage from the upstream machine image former 22 through an inverting section to the upstream machine sheet discharger 25. The plurality of conveyance roller pairs are driven by non-illustrated motors, and convey sheets.

The registrator 241 includes a loop roller pair and a registration roller pair on the sheet conveyance passage. Each of the loop roller pair and the registration roller pair can be driven and rotated by a non-illustrated motor.

The leading end of a sheet that has been conveyed on the sheet conveyance passage and has been conveyed out by the loop roller pair is put into the registration roller pair the rotation of which is stopped. In the state where the leading end of the sheet is put into the registration roller pair, the trailing end of the sheet is conveyed by the rotating loop roller pair. As a result, a registration loop is formed by the sheet between the registration roller pair and the loop roller pair.

In the state where the registration loop is formed, the loop roller pair is stopped once, and thereafter, the registration roller pair and the loop roller pair start rotation with a timing to synchronize with image formation by the upstream machine image former 22. The bend (skew) of the sheet with respect to the conveyance direction is corrected by the formation of the registration loop. The sheet is conveyed to the upstream machine image former 22 through the registration roller pair.

Hereinafter, in the present specification, an operation to form a registration loop is referred to as a "registration loop operation", and a time from when a sheet has arrived at the registrator 241 until a registration loop is formed is referred to as a "registration loop time".

The operation display 26 includes, for example, a display and a keyboard, or a touch panel, and functions as an input unit and an output unit. The keyboard includes a plurality of keys, such as selection keys to designate the size of sheets, numeric keys to set the number of sheets to be copied, a start key to instruct start of operation, a stop key to instruct stop of operation, and the like. The input unit is used by a user in order to perform various instructions, such as character input, various settings, start instructions, and the like. The output unit is used to indicate the device constitutions, the execution situation of each of print jobs, the occurrence situation of sheet jams, the occurrence situation of errors, settings capable of being changed at present, and the like for a user.

The upstream machine controller 27 controls the image reader 21, the upstream machine image former 22, the upstream machine sheet feeder 23, the upstream machine sheet conveyor 24, the upstream machine sheet discharger 25, the operation display 26, and the sheet feeding apparatus 10. The upstream machine controller 27 includes an auxiliary storage device, a memory, a CPU (Central Processing Unit), and an I/F (Interface) which are not shown. These constitutional elements are connected to each other through buses so as to be able to communicate with each other.

The auxiliary storage device includes, for example, a large capacity storage device, such as a hard disk drive and a flash memory. The memory includes a RAM (Random Access Memory) and a ROM (Read Only Memory). In the RAM, calculation results accompanying execution of the CPU are stored.

Furthermore, the upstream machine controller 27 communicates with other apparatuses such as the sheet feeding apparatus 10 via the I/F (Interface).

In the upstream machine controller 27, the CPU executes control programs for the upstream machine. The control programs for the upstream machine are stored in, for example, the auxiliary storage device, and at the time of being executed by the CPU, the control programs are loaded on the RAM of the memory. In accordance with the above-described control programs, the CPU controls the image reader 21, the upstream machine image former 22, the upstream machine sheet feeder 23, the upstream machine sheet conveyor 24, the upstream machine sheet discharger 25, the operation display 26, and the sheet feeding apparatus 10.

As shown in FIG. 2, the upstream machine controller 27 includes a tandem system administrator 271, an upstream machine state administrator 272, an upstream machine image processor 273, and an upstream machine mechanical controller 274.

The tandem system administrator 271 presides over and administrates the tandem constitution of the upstream machine 20 and the downstream machine 30 in response to the instructions of a user received by the operation display 26. The tandem system administrator 271 acquires the apparatus state of the upstream machine 20 through the upstream machine state administrator 272, and acquires the apparatus state of the downstream machine 30 through the downstream machine state administrator 351. The upstream machine state administrator 272 saves the information with regard to the apparatus state of the upstream machine 20, such as an amount of use and amount of wear of the conveyance rollers of the upstream machine sheet conveyor 24, an amount of use and amount of wear of each of the loop rollers and registration rollers of the registrator 241, and the temperature of each of the components.

The upstream machine image processor 273 executes various kinds of image processing for image signals output from the image reader 21, and rasterizes print jobs received by a communicator (not shown) so as to produce print image data.

The upstream machine mechanical controller 274 controls the image reader 21, the upstream machine image former 22, the upstream machine sheet feeder 23, the upstream machine sheet conveyor 24, and the sheet feeding apparatus controller 12. In the case where a predetermined condition mentioned later is satisfied, the upstream machine mechanical controller 274 changes a sheet interval at the time of conveying sheets from the upstream machine 20 to the downstream machine 30 by controlling the registrator 241 and adjusting a start timing of sheet conveyance from the upstream machine 20 to the downstream machine 30. In the present specification, the above-described sheet interval is written as an "upstream machine sheet interval". The details of a method of controlling the registrator 241 by the upstream machine mechanical controller 274 are described later.

<Downstream Machine 30>

As shown in FIG. 1, the downstream machine 30 includes a downstream machine image former 31, a downstream machine sheet feeder 32, a downstream machine sheet conveyor 33, a downstream machine sheet discharger 34, and a downstream machine controller 35, and functions as a second image forming apparatus. The downstream machine 30 is connected in series to the upstream machine 20, and is disposed on the downstream side in a sheet conveyance direction with respect to the upstream machine 20.

The respective constitutions of the downstream machine image former 31, the downstream machine sheet feeder 32, the downstream machine sheet conveyor 33, and the downstream machine sheet discharger 34 are the same as the respective constitutions of the upstream machine image former 22, the upstream machine sheet feeder 23, the upstream machine sheet conveyor 24, and the upstream machine sheet discharger 25. Accordingly, detailed descriptions for those constitutions are omitted.

The downstream machine controller 35 controls the downstream machine image former 31, the downstream machine sheet feeder 32, the downstream machine sheet conveyor 33, the downstream machine sheet discharger 34 and a first, second, and third post processing apparatuses 40, 50, and 60. The downstream machine controller 35 includes an auxiliary storage apparatus, a memory, a CPU, and an I/F which are not shown. These constitutional elements are connected to each other via buses so as to be able to communicate with each. The respective constitutions of the auxiliary storage device, memory, and CPU of the downstream machine controller 35 are the same as the respective constitutions of the auxiliary storage device, memory, and CPU of the upstream machine controller 27. Accordingly, detailed descriptions for those constitutions are omitted.

The downstream machine controller 35 communicates with the other apparatuses, such as the first, second, and third post processing apparatuses 40, 50, and 60 via the I/F.

In the downstream machine controller 35, the CPU executes control programs for the downstream machine. The control programs for the downstream machine are stored in, for example, the auxiliary storage device, and at the time of being executed by the CPU, the control programs are loaded on the RAM of the memory. In accordance with the above control programs, the CPU controls the downstream machine image former 31, the upstream machine sheet feeder 32, the downstream machine sheet conveyor 33, the downstream machine sheet discharger 34, and the first, second, and third post processing apparatuses 40, 50, and 60.

As shown in FIG. 2, the downstream machine controller 35 includes a downstream machine state administrator 351, a downstream machine image processor 352, and a downstream machine mechanical controller 353. The respective constitutions of the downstream machine state administrator 351 and the downstream machine image processor 352 are the same as the respective constitutions of the upstream machine state administrator 272 and the upstream machine image processor 273. Accordingly, detailed descriptions for those constitutions are omitted.

The downstream machine mechanical controller 353 controls the downstream machine image former 31, the downstream machine sheet feeder 32, the downstream machine sheet conveyor 33, and post processing controllers 42, 52, and 62. The downstream machine mechanical controller 353 controls the registrator 331 of the downstream machine sheet conveyor 33 so as to maintain a sheet interval (hereafter, written as a "downstream machine sheet interval") at the time of conveying sheets from the downstream machine 30 to the first post processing apparatus 40 at a predetermined first sheet interval. The first sheet interval may be set beforehand and stored in the auxiliary storage device of each of the upstream machine controller 27 and the downstream machine controller 35. Alternatively, the first sheet interval may be set appropriately in accordance with the type of post processing executed by the post processing apparatuses 40, 50, and 60. The details of a method of controlling the registrator 331 by the downstream machine mechanical controller 353 will be described later.

<First Post Processing Apparatus 40>

The first post processing apparatus 40 inverts the front and back surfaces of a sheet supplied from the downstream machine 30, and supplies the sheet to the second post processing apparatus 50. As shown in FIG. 1, the first post processing apparatus 40 includes a sheet inverter 41 and a post processing controller 42, and is disposed on the downstream side in the sheet conveyance direction with respect to the downstream machine 30. The post processing controller 42 controls the sheet inverter 41 so as to invert the front and back surfaces of a sheet supplied from the downstream machine 30 in accordance with the instructions of the downstream machine 30.

<Second Post Processing Apparatus 50>

The second post processing apparatus 50 conveys or applies post processing for sheets supplied from the first post processing apparatus 40, and supplies the sheets to the third post processing apparatus 60. The second post processing apparatus 50 includes a post processor 51 and a post processing controller 52, and is disposed on the downstream side in the sheet conveyance direction with respect to the first post processing apparatus 40.

The post processor 51 executes at least any one of post processing including punching processing, stapling processing, curl correction processing, saddle stitching processing, cutting processing, and the like for sheets. The post processing controller 52 controls the post processor 51 in accordance with the instructions of the downstream machine 30 so as to execute post processing for sheets supplied from the first post processing apparatus 40.

<Third Post Processing Apparatus 60>

The third post processing apparatus 60 conveys or applies post processing for sheets supplied from the second post processing apparatus 50, and discharges the sheets to the outside. The third post processing apparatus 60 includes a post processor 61 and a post processing controller 62, and is disposed on the downstream side in the sheet conveyance direction with respect to the second post processing apparatus 50.

The post processor 61 executes at least any one of post processing including punching processing, stapling processing, curl correction processing, saddle stitching processing, cutting processing, and the like for sheets. The post processing controller 62 controls the post processor 61 in accordance with the instructions of the downstream machine 30 so as to execute post processing for sheets supplied from the second post processing apparatus 50.

<Control Method for the Upstream Machine 20 and the Downstream Machine 30>

Hereinafter, with reference to FIGS. 3 to 5, a control method for the upstream machine 20 and the downstream machine 30 in the present embodiment will be described.

Figure 3:
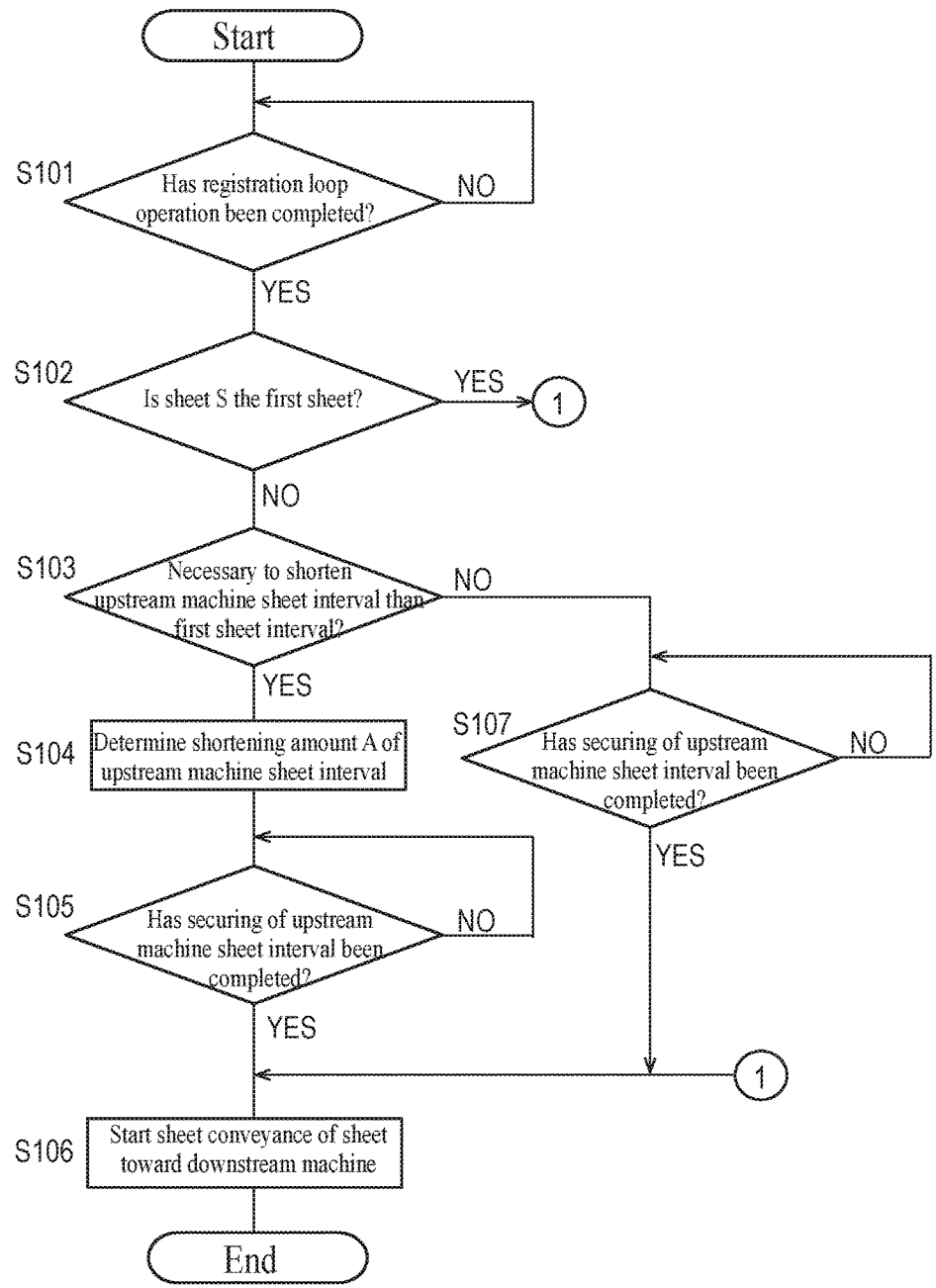
FIG. 3 is a flow chart exemplifying processing procedures for each sheet in a registrator of an upstream machine.
Figure 4:
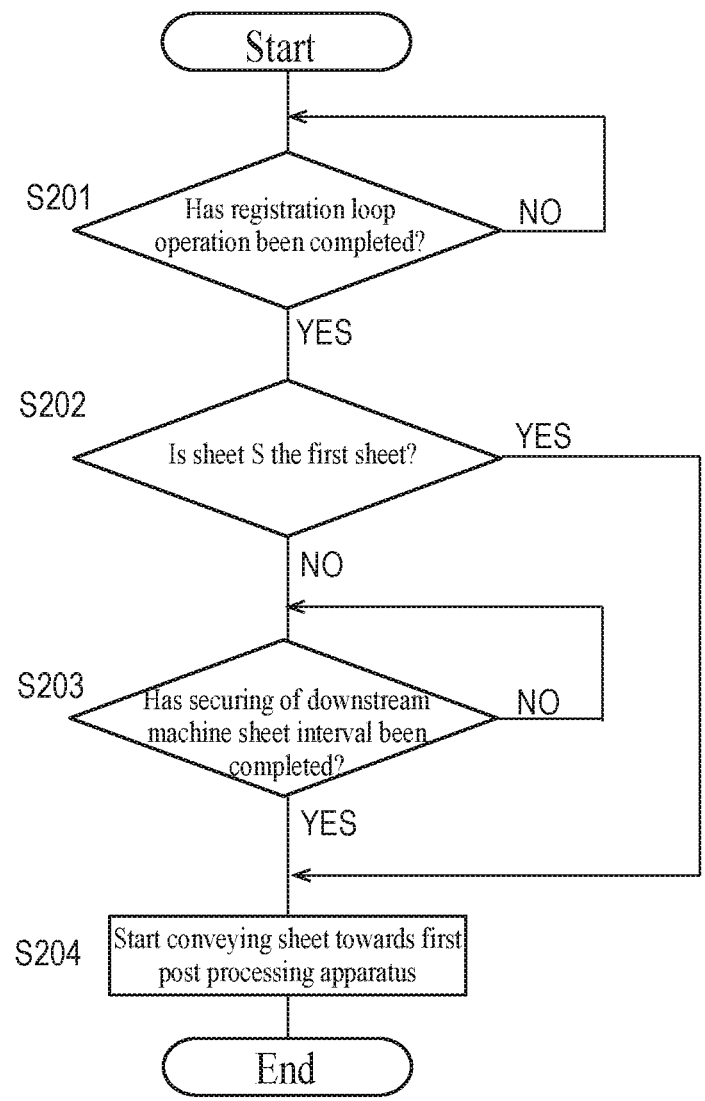
FIG. 4 is a flow chart exemplifying processing procedures for each sheet in a registrator of a downstream machine.

FIG. 3 is a flowchart exemplifying processing procedures for each of sheets in the registrator 241 of the upstream machine 20, and FIG. 4 is a flowchart exemplifying processing procedures for each of sheets in the registrator 331 of the downstream machine 30. Moreover, FIG. 5 is a schematic diagram for describing the sheet conveyance processing from the upstream machine 20 to the downstream machine 30 shown in FIG. 1 while following the passage of time.

The processing in the flowchart shown in FIG. 3 is realized by executing the control programs for the upstream machine by the CPU of the upstream machine controller 27. Furthermore, the processing in the flowchart shown in FIG. 4 is realized by executing the control programs for the downstream machine by the CPU of the downstream machine controller 35.

In the present embodiment, the sheet feeding apparatus 10 supplies continuously a plurality of sheets S1, S2, S3 to Sn to the upstream machine 20. At least one of the upstream machine 20 and the downstream machine 30 forms images on the sheets S1, S2, S3 to Sn sequentially. Each of the first, second, and third post processing apparatus 40, 50, and 60 executes post processing sequentially for the sheets S1, S2, S3 to Sn as required.

In the upstream machine 20, the upstream machine sheet conveyor 24 conveys the sheets S1, S2, S3 to Sn sequentially along a passage from an introduction port to introduce sheets from the sheet feeding apparatus 10 through the registrator 241 and the upstream machine image former 22 to the upstream machine sheet discharger 25.

Moreover, in the downstream machine 30, the downstream machine sheet conveyor 33 conveys the sheets S1, S2, S3 to Sn sequentially along a passage from an introduction port to introduce sheets from the upstream machine 20 through the registrator 331 and the downstream machine image former 31 to the downstream machine sheet discharger 34.

Hereinafter, the control for the registrator 241 by the upstream machine mechanical controller 274 will be described. In the case where a sheet S arrives at the registrator 241, the upstream machine mechanical controller 274 controls the loop roller pair and the registration roller pair so as to form the registration loop of the sheet S.

As shown in FIG. 3, the upstream machine mechanical controller 274 determines whether the registration loop operation has been completed in the registrator 241 (Step S101). In the case where the registration loop operation has not been completed (Step S101: NO), the process is made to wait until the registration loop operation has been completed.

On the other hand, in the case where the registration loop operation has been completed (Step S101: YES), the upstream machine mechanical controller 274 determines whether the sheet S is the first sheet (Step S102). In the case where the sheet S is the first sheet S1 (Step S102: YES), the upstream machine mechanical controller 274 controls the registrator 241 so as to start sheet conveyance toward the downstream machine 30 (Step S106). Then, the upstream machine mechanical controller 274 ends the process of controlling the registrator 241 (End). As shown in FIG. 5, in the case where the sheet S is the first sheet S1, since there is no sheet preceding the sheet S, the upstream machine mechanical controller 274 does not need to adjust the upstream machine sheet interval, and immediately starts conveying the sheet S toward the downstream machine 30.

On the other hand, in the case where the sheet S is not the first sheet S1 (Step S102: NO), the upstream machine mechanical controller 274 determines whether it is necessary to shorten the upstream machine sheet interval than the first sheet interval (Step S103). In the present embodiment, the upstream machine sheet interval is, for example, a temporal interval from the time when the conveyance of the sheet S in the registrator 241 is started to the time when the conveyance of a sheet succeeding the sheet S is started. That is, the upstream machine sheet interval is equivalent to a temporal interval from the leading end of the sheet S conveyed out from the registrator 241 to the leading end of a sheet succeeding the sheet S. In the present embodiment, in the case where the above-described predetermined condition is not satisfied, the upstream machine sheet interval is set basically to a predetermined value, for example, the same value as the first sheet interval.

The first sheet interval is a fixed sheet interval set in consideration of the processing time necessary for post processing for sheets in the first, second, and third post processing apparatus 40, 50, and 60. In the present embodiment, the first sheet interval may be set, for example, to 500 [ms].

The determination whether it is necessary to shorten the upstream machine sheet interval than the first sheet interval is made based on whether the above-described predetermined condition is satisfied. The above-described predetermined condition means to satisfy any one of a first condition and a second condition which are described below.

The first condition is that a sheet S becoming the target of the determination among a plurality of sheets conveyed continuously to the upstream machine 20 corresponds to the second sheet S2.

Furthermore, the second condition is a case where a sheet interval (hereinafter, referred to as a "preceding sheet's sheet interval") between a first sheet preceding the sheet S and a sheet preceding the first sheet in the upstream machine 20 becomes longer than the first sheet interval.

That is, the second condition is a case where the actual conveyance start time of the first sheet preceding the sheet S in the upstream machine 20 is later than the scheduled conveyance start time of the first sheet calculated based on the conveyance start time of a sheet preceding the first sheet and the first sheet interval. A delay time from the scheduled conveyance start time of the first sheet is referred to as a "preceding sheet delay time".

In the case where the above-described predetermined condition is satisfied, the upstream machine mechanical controller 274 determines such that it is necessary to shorten the upstream machine sheet interval than the first sheet interval (Step S103: YES). In this case, the upstream machine mechanical controller 274 determines the shortening amount A of the upstream machine sheet interval (Step S104). The shortening amount A is an amount (time) to shorten the upstream machine sheet interval from the first sheet interval.

In the case where the first condition is satisfied, the upstream machine mechanical controller 274 sets a predetermined shortening time as the shortening amount A, and makes a value obtained by subtracting the shortening amount A from the initial first sheet interval to an upstream machine sheet interval about the sheet S. That is, the upstream machine mechanical controller 274 can switch the setting so as to shorten the upstream machine sheet interval (the second sheet interval) at the time of conveying a sheet from the upstream machine 20 to the downstream machine 30 than the first sheet interval at the time of conveying a sheet from the downstream machine 30 to the first post processing apparatus 40.

In the present embodiment, the predetermined shortening time can be set to, for example, 10 [ms]. As shown in FIG. 5, in the case where the sheet S is the second sheet S2, the shortened upstream machine sheet intervals is 490 [ms] obtained by the calculation of (500−10=490 [ms]).

Moreover, in the case where the second condition is satisfied, the upstream machine mechanical controller 274 calculates a difference between a preceding sheet's sheet interval and the first sheet interval. In the case where the difference between the preceding sheet's sheet interval and the first sheet interval is the shortening time or more, the shortening time is set as the shortening amount A. On the other hand, in the case where the difference between the preceding sheet interval and the first sheet interval is smaller than the shortening time, the preceding sheet delay time is set as the shortening amount A. A specific example in the case where the second condition is satisfied will be described in detail in an exampled described later.

Next, the upstream machine mechanical controller 274 determines whether the securing of the upstream machine sheet interval has been completed (Step S105). In the case where the securing of the upstream machine sheet interval has not been completed (Step S105: NO), the upstream machine mechanical controller 274 waits until the upstream machine sheet interval calculated based on the shortening amount A in Step S104, for example, 490 [ms] is secured.

On the other hand, in the case where the securing of the upstream machine sheet interval has been completed (Step S105: YES), the upstream machine mechanical controller 274 controls the registrator 241 so as to start conveying the sheet toward the downstream machine 30 (Step S106). Subsequently, the upstream machine mechanical controller 274 ends the process of controlling the registrator 241 (End).

On the other hand, in the case where both the first condition and the second condition are not satisfied, the upstream machine mechanical controller 274 determines that it is not necessary to shorten the upstream machine sheet interval than the first sheet interval (Step S103: NO). As shown in FIG. 5, in the case where, for example, the sheet S is the third sheet S3, the upstream machine mechanical controller 274 determines whether the securing of the upstream machine sheet interval (500 [ms]) has been completed (Step S107), in the case where the securing of the upstream machine sheet interval for the sheet S3 has not been completed (Step S107: NO), the upstream machine mechanical controller 274 waits until the upstream machine sheet interval is secured.

On the other hand, in the case where the securing of the upstream machine sheet interval for the sheet S3 has been completed (Step S107: YES), the upstream machine mechanical controller 274 controls the registrator 241 so as to start the sheet conveyance of the sheet S3 toward the downstream machine 30 (Step S106). Subsequently, the upstream machine mechanical controller 274 ends the process of controlling the registrator 241 (End).

Successively, description is given to the control for the registrator 331 by the downstream machine mechanical controller 353. As shown in FIG. 1, sheets conveyed out from the registrator 241 of the upstream machine 20 arrive at the registrator 331 of the downstream machine 30 through the upstream machine image former 22 and the upstream machine sheet discharger 25. As shown in FIG. 5, in the present specification, a time taken to convey a sheet on a passage from the registrator 241 of the upstream machine 20 to the registrator 331 of the downstream machine 30 without delay is referred to as a "no-delay registrator arrival time".

In the present embodiment, the no-delay registrator arrival time may be set to, for example, 950 [ms].

As shown in FIG. 4, the downstream machine mechanical controller 353 determines whether the registration loop operation has been completed in the registrator 331 (Step S201). In the case where the registration loop operation has not been completed (Step S201: NO), the downstream machine mechanical controller 353 waits until the registration loop operation has been completed. In the present embodiment, the registration loop time may be set to, for example, 50 [ms].

On the other hand, in the case where the registration loop operation has been completed (Step S201: YES), it is determined whether the sheet S is the first sheet S1 (Step S202). In the case where the sheet S is the first sheet S1 (Step S202: YES), the downstream machine mechanical controller 353 controls the registrator 331 so as to start conveying the sheet towards the first post processing apparatus 40 (Step S204). Subsequently, the downstream machine mechanical controller 353 ends the process of controlling the registratotor 331 (End).

Figure 5:
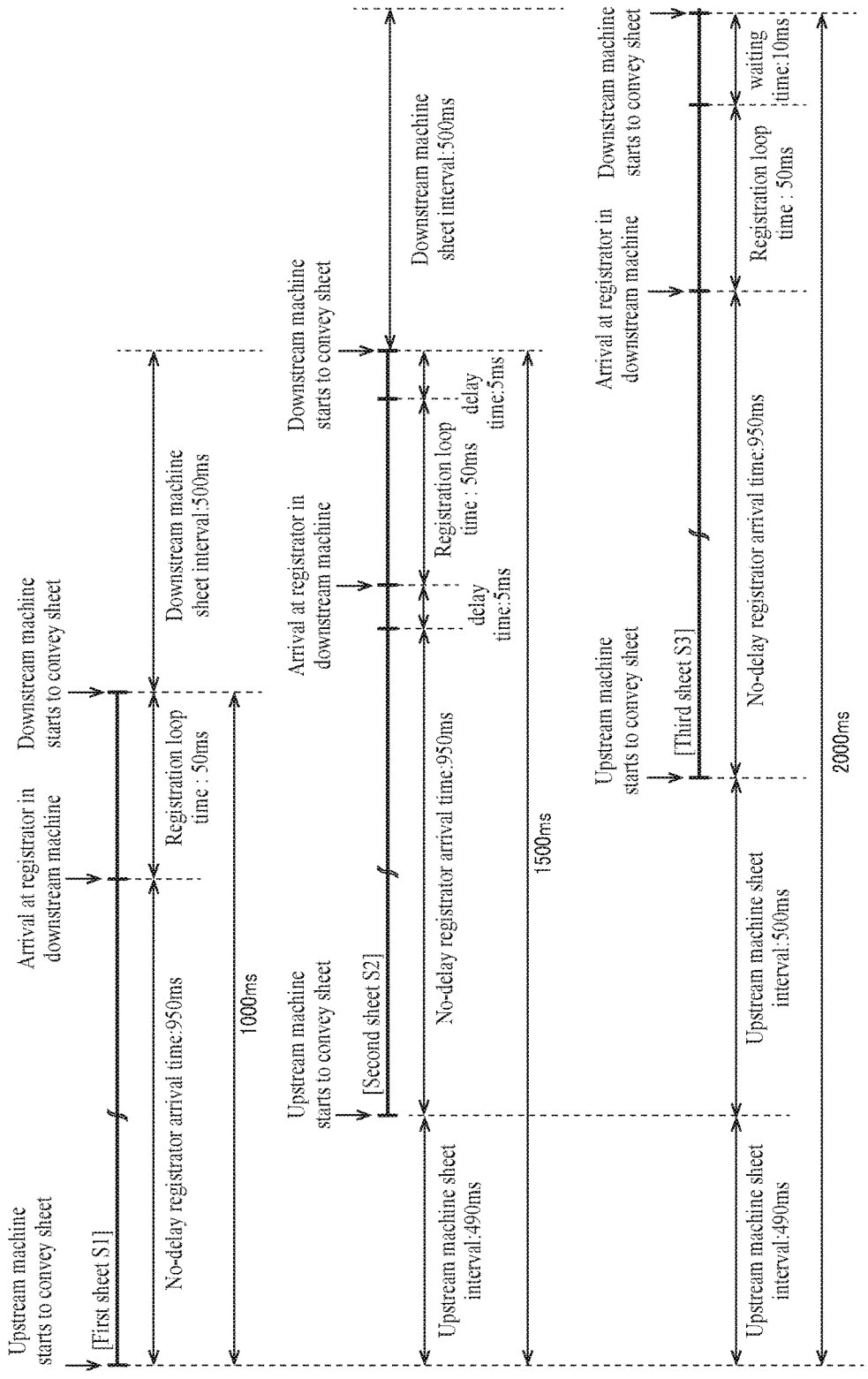
FIG. 5 is a schematic diagram for describing sheet conveyance processing from an upstream machine to a downstream machine shown in FIG. 1 while following the passage of time.

As shown in FIG. 5, in the case where the sheet S is the first sheet S1, since there is no sheet preceding the sheet S, the downstream machine mechanical controller 353 does not need to adjust a downstream machine sheet interval, and immediately starts conveying the sheet S toward the first post processing apparatus 40.

On the other hand, in the case where the sheet S is not the first sheet S1 (Step S202: NO), the downstream machine mechanical controller 353 determines whether the securing of the first sheet interval (500 [ms]) as the downstream machine sheet interval has been completed (Step S203). In the case where the securing of the downstream machine sheet interval has not been completed (Step S203: NO), the downstream machine mechanical controller 353 waits until the downstream machine sheet interval has been secured.

On the other hand, in the case where the securing of the downstream machine sheet interval has been completed (Step S203: YES), the downstream machine mechanical controller 353 controls the registrator 331 so as to start conveying the sheet toward the first post processing apparatus 40 (Step S204). Subsequently, the downstream machine mechanical controller 353 ends the process of controlling the registrator 331 (End).

As shown in FIG. 5, on the assumption that the conveyance start time of the upstream machine 20 for the first sheet S1 is made to the reference time 0 [ms], the sheet S1 conveyed out from the registrator 241 will arrive at the registrator 331 after the no-delay registrator arrival time (950 [ms]). In the present specification, a time when the sheet arrives at the registrator 331, is referred to as a "registrator arrival time".

Successively, in the registrator 331, a registration loop is formed for the sheet S1. A registrator loop time, for example, 50 [ms], is taken until the registration loop operation has been completed.

Since there is no sheet preceding the sheet S1, the downstream machine mechanical controller 353 does not need to adjust the downstream machine sheet interval, and immediately starts conveying the sheet S1 toward the first post processing apparatus 30. Accordingly, the conveyance start time in the downstream machine 30 for the sheet S1 becomes 1000 [ms].

Moreover, the conveyance for the second sheet S2 is started after the upstream machine sheet interval (490 [ms]) shortened from the above-described reference time. In the example shown in FIG. 5, it is assumed a case where a delay time of 5 [ms] occurs on the sheet S2 due to, for example, a slip of the sheet S2 and the like between the registrator 241 and the registrator 331.

In this case, the registrator arrival time becomes the time obtained by adding the no-delay registrator arrival time (950 [ms]) and the delay time (5 [ms]) to the conveyance start time of the upstream machine 20. On the assumption that the registration loop time is 50 [ms], a time when the registration loop operation has been completed becomes after 1495 (=490+950+5+50) [ms] from the above reference time.

Since it is necessary to maintain the downstream machine sheet interval at the first sheet interval (500 [ms]), the conveyance start time of the downstream machine 30 for the sheet S2 is set to 1500 [ms]. Accordingly, the downstream machine mechanical controller 353 sets the waiting time from the completion of the registration loop operation for the sheet S2 to the conveyance start time of the downstream machine 30 to 5 (=1500−1495) [ms].

Furthermore, a delay time has not occurred for the third sheet S3. Accordingly, the time when the registration loop operation ends, becomes after 1990 (=490+500+950+50) [ms] from the above-described reference time. Therefore, the downstream machine mechanical controller 353 waits for only 10 (=2000−1990) [ms] as a waiting time from the completion of the registration loop operation for the sheet S3 to the conveyance start time of the downstream machine 30.

<Example of Conveyance Processing in consideration of only the First Condition>

Hereinafter, an example of conveyance processing in consideration of only the first condition is shown. The following table 1 is a table showing a calculation example of conveyance processing for the first to sixth sheets S1 to S6 in the case a delay time does not occur on sheet conveyance on a passage from the registrator 241 to the registrator 331 (hereinafter, also described as "the upstream machine to the downstream machine"). Moreover, the following table 2 is a table showing a calculation example of conveyance processing for the first to sixth sheets S1 to S6 in the case where a delay time occurs on sheet conveyance on the upstream machine to the downstream machine.

TABLE 1

| | Upstream machine Conveyance start time [ms] | Upstream machine to downstream machine Delay time [ms] | Downstream machine | | | | |
|---|---|---|---|---|---|---|---|
| | | | Registrator arrival time [ms] | Registration loop time [ms] | Waiting time [ms] | Conveyance start time [ms] | Shortest sheet interval [ms] |
| First sheet | 0 | 0 | 950 | 50 | — | 1000 | — |
| Second sheet | 490 | 0 | 1440 | 50 | 10 | 1500 | 440 |

TABLE 1-continued

| | Upstream machine Conveyance start time [ms] | Upstream machine to downstream machine Delay time [ms] | Downstream machine | | | | Shortest sheet interval [ms] |
|---|---|---|---|---|---|---|---|
| | | | Registrator arrival time [ms] | Registration loop time [ms] | Waiting time [ms] | Conveyance start time [ms] | |
| Third sheet | 990 | 0 | 1940 | 50 | 10 | 2000 | 440 |
| Fourth sheet | 1490 | 0 | 2440 | 50 | 10 | 2500 | 440 |
| Fifth sheet | 1990 | 0 | 2940 | 50 | 10 | 3000 | 440 |
| Sixth sheet | 2490 | 0 | 3440 | 50 | 10 | 3500 | 440 |

In the above-described table 1, the "shortest sheet interval" on the eighth column is a time interval from a time (conveyance start time) when the conveyance of the sheet S is started in the downstream machine 30 to a time (registrator arrival time) when a sheet succeeding the sheet S arrives at the registrator 331 of the downstream machine 30. For example, the shortest sheet interval of the second sheet S2 is 440 [ms] obtained by subtracting the conveyance start time (1000 [ms]) of the sheet S1 in the downstream machine 30 from the registrator arrival time (1440 [ms]) of the sheet S2.

In order to avoid the lowering of the conveying performance of each sheet, the registration loop time is sufficiently secured such that the correction for a bend of a sheet is executed appropriately. In the present embodiment, the registration loop time of, for example, 50 [ms] is always secured.

As shown in Table 1, in the present embodiment, for the second sheet S2 satisfying the first condition, the conveyance start time of the upstream machine 20 is advanced forward by 10 [ms]. Accordingly, in the downstream machine 30, a waiting time of 10 [ms] occurs. With this, since the registrator arrival time of each sheet becomes faster, a sheet interval is shortened in the downstream machine 30. However, since a sheet interval of 440 [ms] is secured as the shortest sheet interval for each sheet, the control collapse or sheet collision in the sheet conveyance do not occur. Moreover, since the downstream machine sheet interval is 500 [ms] for each sheet, that is, the first sheet interval is secured, the lowering of the productivity of print processing does not happen.

As shown in Table 2, even if a delay time occurs on sheet conveyance on the upstream machine to the downstream machine, by shortening the waiting time in the downstream machine 30, the downstream machine sheet interval is secured as the first sheet interval for each sheet, and the lowering of the productivity of print processing does not happen.

In contrast to the above example, similarly to the conventional image forming system, a case where the conveyance start time of the upstream machine 20 for the sheet S2 is not advanced forward and the first sheet interval of the downstream machine 30 is secured for all the sheets in the upstream machine 20, is described hereinafter as a first comparative example.

In the conventional image forming system, the upstream machine calculates a fixed sheet interval at the time of conveying sheets from the upstream machine to the downstream machine based on a sheet interval required for the post processing in the post processing apparatus. Then, the conventional image forming system is constituted so as to convey sheets from the upstream machine to the downstream machine with this fixed sheet interval. This is because the sheet conveyance control in the upstream machine becomes complicated in the case where it is attempted to control the sheet conveyance from the upstream machine to the downstream machine in consideration of the sheet conveyance from the downstream machine to the post processing apparatus. Moreover, the downstream machine is constituted such that the interval of the sheets to be conveyed to the post processing apparatus becomes constant.

TABLE 2

| | Upstream machine Conveyance start time [ms] | Upstream machine to downstream machine Delay time [ms] | Downstream machine | | | | Shortest sheet interval [ms] |
|---|---|---|---|---|---|---|---|
| | | | Registrator arrival time [ms] | Registration loop time [ms] | Waiting time [ms] | Conveyance start time [ms] | |
| First sheet | 0 | 0 | 950 | 50 | — | 1000 | — |
| Second sheet | 490 | 5 | 1445 | 50 | 5 | 1500 | 445 |
| Third sheet | 990 | 0 | 1940 | 50 | 10 | 2000 | 440 |
| Fourth sheet | 1490 | 5 | 2445 | 50 | 5 | 2500 | 445 |
| Fifth sheet | 1990 | 0 | 2940 | 50 | 10 | 3000 | 440 |
| Sixth sheet | 2490 | 5 | 3445 | 50 | 5 | 3500 | 445 |

In this way, the upstream machine conveys sheets to the downstream machine with a fixed sheet interval based on the sheet interval required for the post processing in the post processing apparatus, and in the ideal case where delay does not occur in the section from the upstream machine to the downstream machine, the downstream machine conveys sheets to the post processing apparatus while keeping the above-described fixed sheet interval. With such a constitution, in the conventional image forming system, since the fixed sheet interval is secured in the upstream machine, it is not necessary in the downstream machine to expand the sheet interval in order to obtain a sheet interval required for the post processing in the post processing apparatus.

First Comparative Example

The following table 3 is a table showing a calculation example of conveyance processing for the first to sixth sheets S1 to S6 as a comparative example in the case delay does not occur on sheet conveyance on the upstream machine to the downstream machine. Moreover, the following table 4 is a table showing a calculation example of conveyance processing for the first to sixth sheets S1 to S6 as a comparative example in the case where delay occurs on sheet conveyance on the upstream machine to the downstream machine. In Table 4, a cumulative delay time is the accumulated time of the delay times of the sheets conveyed on the upstream machine to the downstream machine.

TABLE 3

| | Upstream machine Conveyance start time [ms] | Upstream machine to downstream machine Delay time [ms] | Downstream machine | | | |
|---|---|---|---|---|---|---|
| | | | Registrator arrival time [ms] | Registration loop time [ms] | Conveyance start time [ms] | Shortest sheet interval [ms] |
| First sheet | 0 | 0 | 950 | 50 | 1000 | — |
| Second sheet | 500 | 0 | 1450 | 50 | 1500 | 450 |
| Third sheet | 1000 | 0 | 1950 | 50 | 2000 | 450 |
| Fourth sheet | 1500 | 0 | 2450 | 50 | 2500 | 450 |
| Fifth sheet | 2000 | 0 | 2950 | 50 | 3000 | 450 |
| Sixth sheet | 2500 | 0 | 3450 | 50 | 3500 | 450 |

In Table 3, the conveyance start time of the downstream machine 30 for each sheet is a time obtained by adding the no-delay registrator arrival time (950 [ms]) and the registration loop time (50 [ms]) to the conveyance start time of the upstream machine 20. Accordingly, for each sheet, the downstream machine sheet interval is maintained at 500 ms, i.e., at the first sheet interval, and the shortest sheet interval is also maintained at 450 [ms].

TABLE 4

| | Upstream machine Conveyance start time [ms] | Upstream machine to downstream machine | | Downstream machine | | | |
|---|---|---|---|---|---|---|---|
| | | Delay time [ms] | Cumulative delay time [ms] | Registrator arrival time [ms] | Registration loop time [ms] | Conveyance start time [ms] | Shortest sheet interval [ms] |
| First sheet | 0 | 0 | 0 | 950 | 50 | 1000 | — |
| Second sheet | 500 | 5 | 5 | 1455 | 50 | 1505 | 455 |
| Third sheet | 1000 | 0 | 5 | 1950 | 50 | 2005 | 445 |
| Fourth sheet | 1500 | 5 | 10 | 2455 | 50 | 2510 | 450 |
| Fifth sheet | 2000 | 0 | 10 | 2950 | 50 | 3010 | 440 |
| Sixth sheet | 2500 | 5 | 15 | 3455 | 50 | 3515 | 445 |
| Seventh sheet | 3000 | 0 | 15 | 3950 | 50 | 4015 | 435 |

TABLE 4-continued

| | Upstream machine | Upstream machine to downstream machine | | Downstream machine | | | |
|---|---|---|---|---|---|---|---|
| | Conveyance start time [ms] | Delay time [ms] | Cumulative delay time [ms] | Registrator arrival time [ms] | Registration loop time [ms] | Conveyance start time [ms] | Shortest sheet interval [ms] |
| Eighth sheet | 3500 | 5 | 20 | 4455 | 50 | 4520 | 440 |
| Ninth sheet | 4000 | 0 | 20 | 4950 | 50 | 5020 | 430 |
| Tenth sheet | 4500 | 5 | 25 | 5455 | 50 | 5525 | 435 |
| Eleventh sheet | 5000 | 0 | 25 | 5950 | 50 | 6025 | 425 |

However, in Table 4, the conveyance start time of the downstream machine 30 for each sheet becomes the time obtained by adding the no-delay registrator arrival time (950 [ms]), the delay time, and the registration loop time (50 [ms]) to the conveyance start time of the upstream machine 20. Accordingly, the conveyance start time of the downstream machine 30 is delayed by the delay time for each sheet. For example, since the second sheet S2 accompanies the delay time of 5 [ms], the registrator arrival time becomes 1455 [ms], and the conveyance start time of the downstream machine 30 becomes 1505 [ms].

The third sheet S3 does not accompany the delay time, and the registrator arrival time becomes 1950 [ms], However, since the conveyance start time of the sheet S2 has been delayed by 5 [ms], in order to maintain the downstream machine sheet interval at the first sheet interval, the conveyance start time of the sheet S3 becomes 2005 [ms] with the delay of 5 [ms].

Furthermore, since the fourth sheet S4 accompanies again the delay time of 5 [ms], the registrator arrival time becomes 2455 [ms]. Accordingly, the conveyance start time of the sheet S4 delays more by 5 [ms] and becomes 2510 [ms].

After all, the conveyance start time of the downstream machine 30 delays by the cumulative delay time. Therefore, like the first comparative example, in the case where the first sheet interval of the downstream machine 30 is secured for all the sheets in the upstream machine 20, it is impossible to avoid delays in the conveyance start time of the downstream machine 30 due to delays in sheet conveyance, which leads to the lowering of the productivity of print processing. Moreover, as the number of sheets increases, the shortest sheet interval is shortened due to the accumulation of delay times. Accordingly, there is a possibility that the control collapse of sheet conveyance and the collision between sheets may occur.

In the above description, a difference between the first comparative example and the image forming system 1 of the present embodiment has been described.

In the present embodiment, the conveyance start time of the upstream machine 20 is advanced forward so as to secure the waiting time in the downstream machine 30, and the waiting time is adjusted in accordance with the delay time of a sheet conveyed from the upstream machine 20 to the downstream machine 30, thereby realizing the first sheet interval. Namely, the sheet interval needed at the time of conveying sheets from the downstream machine 30 to the first post processing apparatus 40 is not secured for all the sheets in the upstream machine 20, and a part (the extent to which collapse of sheet conveyance control does not occur) is dispersed as the waiting time in the downstream machine 30.

<Example of Conveyance Processing in Consideration of the First Condition and the Second Condition>

Next, with reference to the following table 5, description is given to an example of conveyance processing in consideration of the second condition in addition to the first condition. As described in the above description, the determination whether it is necessary to shorten the upstream machine sheet interval than the first sheet interval is made based on whether any one of the first condition and the second condition is satisfied. The first condition is that the sheet S corresponds to the second sheet S2, and the second condition is the case where the preceding sheet's sheet interval in the upstream machine 20 is longer than the first sheet interval.

TABLE 5

| | Upstream machine Conveyance start time [ms] | Upstream machine to downstream machine Delay time [ms] | Downstream machine | | | | |
|---|---|---|---|---|---|---|---|
| | | | Registrator arrival time [ms] | Registration loop time [ms] | Waiting time [ms] | Conveyance start time [ms] | Shortest sheet interval [ms] |
| First sheet | 0 | 0 | 950 | 50 | — | 1000 | — |
| Second sheet | 490 | 0 | 1440 | 50 | 10 | 1500 | 440 |
| Third sheet | 990 | 5 | 1945 | 50 | 5 | 2000 | 445 |
| Fourth sheet | 1490 | 0 | 2440 | 50 | 10 | 2500 | 440 |

TABLE 5-continued

|  | Upstream machine Conveyance start time [ms] | Upstream machine to downstream machine Delay time [ms] | Downstream machine | | | | Shortest sheet interval [ms] |
|---|---|---|---|---|---|---|---|
|  | | | Registrator arrival time [ms] | Registration loop time [ms] | Waiting time [ms] | Conveyance start time [ms] | |
| Fifth sheet | 1990 | 0 | 2940 | 50 | 10 | 3000 | 440 |
| Sixth sheet | 2495 | 0 | 3445 | 50 | 5 | 3500 | 445 |
| Seventh sheet | 2990 | 0 | 3940 | 50 | 10 | 4000 | 440 |
| Eighth sheet | 3490 | 0 | 4440 | 50 | 10 | 4500 | 440 |
| Ninth sheet | 4500 | 0 | 5450 | 50 | 0 | 5500 | 950 |
| Tenth sheet | 4990 | 0 | 5940 | 50 | 10 | 6000 | 440 |
| Eleventh sheet | 5490 | 0 | 6440 | 50 | 10 | 6500 | 440 |

As shown in Table 5, similarly to the above-described examples, the present example also exemplifies the case where the first sheet interval is 500 [ms], the no-delay registrator arrival time is 950 [ms], the registration loop time is 50 [ms], and the shortening time is 10 [ms].

Moreover, in the present specification, at the time of conveying sheets from the upstream machine 20 to the downstream machine 30, without causing the collapse of sheet conveyance control and sheet collision, the shortest sheet interval (from the leading end of a sheet to the leading end of the following sheet) capable of guaranteeing that sheets are conveyed appropriately is referred to as the "shortest interval". In the present embodiment, the shortest interval may be set to, for example, 450 [ms]. In the present embodiment, the shortest interval is set to a fixed value. However, depending on the conditions such as sheet sizes in the conveyance direction and conveyance speeds of sheets S, the shortest interval may be set to different values. Accordingly, the shortest interval may be set as the different values depending on conveyance control specifications of each of the upstream machine 20 and the downstream machine 30.

Moreover, on the premise that the upstream machine sheet interval becomes the shortest interval or more, the shortening time may be made to a time obtained by adding a margin to the assumed delay time of sheets conveyed from the upstream machine to the downstream machine. The shortening time may be changed (increased or decreased) in accordance with the paper kind of sheets S and the conditions of the upstream machine, for examples, an amount of use of rollers and an amount of wear, in particular, sheet slipperiness which varies due to an amount of use and amount of wear of each of a loop roller pair and a registration roller pair in the registrator 241.

Moreover, in Table 5, it is assumed the case where the following delay times occur. (a) With regard to the third sheet S3, the delay time of 5 [ms] occurs on the upstream machine to the downstream machine. (b) With regard to the sixth sheet S6, the delay time of 5 [ms] occurs in the conveyance start time of the upstream machine 20 with respect to the first sheet interval (500 [ms]). (c) With regard to the ninth sheet S9, the delay time of 510 [ms] occurs in the conveyance start time of the upstream machine 20 with respect to the first sheet interval.

As shown in Table 5, the second sheet S2 is conveyed from the upstream machine 20 to the downstream machine 30 with the shortened upstream machine sheet interval (490 [ms]) shorter than the first sheet interval. Then, in the downstream machine 30, the second sheet S2 waits for 10 [ms] after the registration loop operation, and is conveyed to the first post processing apparatus 40.

Successively, the third sheet S3 is conveyed with the first sheet interval from the upstream machine 20 to the downstream machine 30. On the passage from the upstream machine to the downstream machine, the delay time of 5 [ms] occurs. However, by adjusting the waiting time in the downstream machine 30 to 5 [ms], since the third sheet S3 is conveyed with the first sheet interval as the downstream machine sheet interval to the first post processing apparatus 40, the productivity of print processing does not lower.

Successively, since the fourth sheet S4 and the fifth sheet S5 do not cause a delay time, by setting the waiting time in the downstream machine 30 to 10 [ms], the fourth sheet S4 and the fifth sheet S5 are conveyed with the first sheet interval as the downstream machine sheet interval to the first post processing apparatus 40.

Successively, in the upstream machine 20, the conveyance for the sixth sheet S6 is started with the delay of 5 [ms] with respect to the first sheet interval. That is, the sheet interval between the sheet S5 and the sheet S6 is longer by 5 [ms] than the first sheet interval. Since this delay time is shorter than the shortening time (10 [ms]), the waiting time in the downstream machine 30 is adjusted to 5 [ms], and the sheet S6 is conveyed with the first sheet interval to the first post processing apparatus 40. Accordingly, the productivity of print processing does not lower.

Successively, with regard to the seventh sheet S7, since the conveyance for the sheet S6 in the upstream machine 20 has be started with the delay of 5 [ms] with respect to the first sheet interval, the sheet interval (505 [ms]) between the sheet S5 and the sheet S6 is longer than the first sheet interval (500 [ms]). Accordingly, the seventh sheet S7 satisfies the second condition. Furthermore, since the delay time (5 [ms]) of the sheet S6 is less than the shortening time (10 [ms]), the shortening amount A becomes the delay time (5 [ms]) of the sheet SC.

Therefore, the sheet S7 is conveyed with the upstream machine sheet interval 495 [ms]) shortened by the shortening amount A (5 [ms]) from the first sheet interval (500 [ms]). In the upstream machine 20, the conveyance for the sheet S7 is started with the upstream machine sheet interval shortened by the shortening amount A, whereby in the downstream machine 30, the waiting time (10 [ms]) can be secured again. The sheet S7 is conveyed with the first sheet interval from the downstream machine 30 to the first post processing apparatus 40.

Successively, since the eighth sheet S8 does not causes a delay time, the waiting time in the downstream machine 30 is set to 10 [ms], whereby the eighth sheet S8 is conveyed with the first sheet interval from the downstream machine 30 to the first post processing apparatus 40.

Successively, in the upstream machine 20, the conveyance for the ninth sheet S9 is started after 1010 [ms] with the delay of 510 [ms] with respect to the first sheet interval. Since this delay time 510 [ms] is longer the shortening time (10 [ms]), in order to maximize the productivity of print processing, the waiting time in the downstream machine 30 is set to 0 [ms]. The sheet S9 is conveyed with 1000 [ms] as the downstream machine sheet interval to the first post processing apparatus 40.

Successively, with regard to the tenth sheet S10, since the conveyance for the sheet S9 in the upstream machine 20 has be started with the delay of 510 [ms] with respect to the first sheet interval, the sheet interval (1010 [ms]) between the sheet S8 and the sheet S9 is longer than the first sheet interval (500 [ms]). Accordingly, the sheet S10 satisfies the second condition. Furthermore, since the delay time (510 [ms]) of the sheet S9 is more than the shortening time (10 [ms]), the shortening amount A becomes the shortening time (10 [ms]). Accordingly, the sheet S10 is conveyed with the upstream machine sheet interval (490 [ms]) shortened by 10 [ms] from the first sheet interval. With this, in the downstream machine 30, the waiting time (10 [ms]) can be secured, and the sheet S10 is conveyed with the first sheet interval from the downstream machine 30 to the first post processing apparatus 40.

On the contrary, a case where the seventh sheet S7 and the tenth sheet S10 are conveyed with the first sheet interval without shortening the upstream machine sheet interval is described hereinafter as a second comparative example.

As shown in Table 6, the sixth sheet S6 is conveyed from the upstream machine 20 to the downstream machine 30 with the delay time of 5 [ms]. Accordingly, for the seventh sheet S7 and the subsequent sheets, only the waiting time of 5 [ms] can be secured. Moreover, the ninth sheet S9 is conveyed from the upstream machine 20 to the downstream machine 30 with the delay time of 510 [ms]. Accordingly, for the tenth sheet S10 and the subsequent sheets, the waiting time is lost.

In the above description, a difference between the second comparative example and the image forming system 1 of the present embodiment has been described. The image forming system 1 of the present embodiment has the following effects.

The image forming system 1 is constituted to be able to switch setting so as to shorten the upstream machine sheet interval at the time of conveying sheets from the upstream machine 20 to the downstream machine 30 than the first sheet interval at the time of conveying sheets from the downstream machine 30 to the first post processing apparatus 40. With such a constitution, the conveyance start in the upstream machine 20 is advanced forward, whereby a temporal buffer (margin) until the conveyance of a sheet is started in the downstream machine 30, can be secured.

Therefore, without disposing a mechanism to get back a delay of a sheet between the registrator 241 and the registrator 331, with a simple constitution, even in the case where a delay of a sheet occurs between the registrator 241 and the registrator 331, it becomes possible to prevent the lowering of the productivity of print processing and the occurrence of sheet jams.

Moreover, in order to maintain the downstream machine sheet interval at a fixed interval for the plurality of sheets conveyed continuously from the downstream machine 30 to the first post processing apparatus 40, the sheet is made to wait in the downstream machine 30, and thereafter, is conveyed to the first post processing apparatus 40. With such a constitution, the waiting time is adjusted in accordance with a delay time of each sheet, whereby the first sheet interval can be secured in the downstream machine 30.

Second Comparative Example

TABLE 6

| | Upstream machine Conveyance start time [ms] | Upstream machine to downstream machine Delay time [ms] | Downstream machine | | | | |
| --- | --- | --- | --- | --- | --- | --- | --- |
| | | | Registrator arrival time [ms] | Registration loop time [ms] | Waiting time [ms] | Conveyance start time [ms] | Shortest sheet interval [ms] |
| First sheet | 0 | 0 | 950 | 50 | — | 1000 | — |
| Second sheet | 490 | 0 | 1440 | 50 | 10 | 1500 | 440 |
| Third sheet | 990 | 5 | 1945 | 50 | 5 | 2000 | 445 |
| Fourth sheet | 1490 | 0 | 2440 | 50 | 10 | 2500 | 440 |
| Fifth sheet | 1990 | 0 | 2940 | 50 | 10 | 3000 | 440 |
| Sixth sheet | 2495 | 0 | 3445 | 50 | 5 | 3500 | 445 |
| Seventh sheet | 2995 | 0 | 3945 | 50 | 5 | 4000 | 445 |
| Eighth sheet | 3495 | 0 | 4445 | 50 | 5 | 4500 | 445 |
| Ninth sheet | 4505 | 0 | 5455 | 50 | 0 | 5505 | 955 |
| Tenth sheet | 5505 | 0 | 5955 | 50 | 0 | 6005 | 450 |
| Eleventh sheet | 5505 | 0 | 6455 | 50 | 0 | 6505 | 450 |

Moreover, with regard to a plurality of sheets conveyed continuously to the upstream machine 20, in the case where a sheet S corresponds to the second sheet S2, the upstream machine sheet intervals is made shorter than the first sheet interval. With such a constitution, the conveyance start for the second sheet S2 and the subsequent sheets in the plurality of sheets can be advanced forward in the upstream machine 20 with absolute certainly.

Moreover, in the case where a sheet interval between the first sheet conveyed from the upstream machine 20 to the downstream machine 30 and a sheet preceding the first sheet is longer than the first sheet interval, the upstream machine sheet interval between the first sheet and the second sheet succeeding the first sheet is made shorter than the first sheet interval. With such a constitution, even in the case where the conveyance start for the first sheet in the upstream machine 20 is delayed, the delay of the conveyance start for the second sheet in the upstream machine 20 is avoided, and the waiting time in the downstream machine 30 can be maximally secured again.

Moreover, the upstream machine sheet interval is changed or adjusted in accordance with the paper kind of the sheets S conveyed from the upstream machine 20 to the downstream machine 30, or an amount of use of the rollers of the upstream machine 20. With such a constitution, even in the case where the slipperiness of sheets varies due to the paper kind of the sheets S or an amount of use of the rollers of the upstream machine 20, the suitable upstream machine sheet interval can be maintained.

As described in the above description, in the embodiment, the tandem type image forming apparatus, method for controlling the image forming apparatus, and image forming system of the present invention have been described. However, needless to say, those skilled in the art can appropriately add, modify, and omit the present invention within the scope of its technical concept.

For example, in the above-described embodiment, the case where the first sheet interval is constant, has been described. However, the present invention should not be limited to the above case, and the first sheet interval may be changeable.

Furthermore, in the above-described embodiment, the waiting time is set to be taken after the registration loop operation. However, the present invention should not be limited to the above case, the waiting time may be set to be taken before the registration loop operation.

Moreover, the control program for the upstream machine and the control program for the downstream machine may be provided by a computer readable storage medium, such as a USB memory, a flexible disk, and a CD-ROM. Alternatively, the control program for the upstream machine and the control program for the downstream machine may be provided by online via a network such as the internet. In this case, usually, the program stored in the computer readable storage medium may be transferred and stored in a memory, a storage, and the like. Moreover, this program may be provided, for example, as a single application software, or may be incorporated in software of each apparatus as one function of the image forming apparatus.

Although embodiments of the present invention have been described and illustrated in detail, it is clearly understood that the same is by way of illustration and example only and not limitation, the scope of the present invention should be interpreted by terms of the appended claims.

What is claimed is:

1. A tandem type image forming system, comprising:
a first image forming apparatus; and
a second image forming apparatus connected in series to the first image forming apparatus and located on a downstream side in a sheet conveyance direction with respect to the first image forming apparatus,
wherein the tandem type image forming system has a controller which, in response to a delay that occurs when conveying a sheet from the first image forming apparatus to the Second image forming apparatus, shortens a second sheet interval when conveying a plurality of consecutive sheets from the first image forming apparatus to the second image forming apparatus so that a first sheet interval when conveying the plurality of consecutive sheets from the second image forming apparatus to a post processing apparatus connected to the second image forming apparatus is maintained at a fixed time interval.

2. The tandem type image forming system according to claim 1, wherein, in order to maintain the first sheet interval at the fixed interval for the plurality of sheets conveyed continuously from the second image forming apparatus to the post processing apparatus, the controller makes a sheet of the plurality of sheets wait in the second image forming apparatus, and thereafter, conveys the sheet to the post processing apparatus.

3. The tandem type image forming system according to claim 1, wherein when the second sheet of the plurality of sheets conveyed continuously is conveyed from the first image forming apparatus to the second image forming apparatus, the controller shortens the second sheet interval relative to the first sheet interval.

4. The tandem type image forming system according to claim 1, wherein in a case where a sheet interval between a first sheet conveyed from the first image forming apparatus to the second image forming apparatus and a sheet preceding the first sheet becomes longer than the first sheet interval, the controller shortens the second sheet interval between the first sheet and a second sheet succeeding the first sheet relative to the first sheet interval.

5. The tandem type image forming system according to claim 1, wherein the tandem type image forming apparatus changes the second sheet interval in accordance with a paper kind of a sheet conveyed from the first image forming apparatus to the second image forming apparatus or an amount of use of rollers of the first image forming apparatus.

6. The tandem type image forming system according to claim 1, wherein the second sheet interval is longer than a shortest interval capable of guaranteeing sheet conveyance in the first image forming apparatus and in the second image forming apparatus.

7. A control method for controlling a tandem type image forming system that includes a first image forming apparatus, and a second image forming apparatus connected in series to the first image forming apparatus and located on a downstream side in a sheet conveyance direction with respect to the first image forming apparatus, the control method comprising:
conveying a sheet from the first image forming apparatus to the second image forming apparatus; and
conveying the sheet from the second image forming apparatus to a post processing apparatus connected to the second image forming apparatus;
wherein, in response to a delay that occurs when conveying a sheet from the first image forming apparatus to the second image forming apparatus, the tandem type image forming system shortens a second sheet interval when conveying a plurality of consecutive sheets from the first image forming apparatus to the second image forming apparatus so that a first sheet interval when conveying the plurality of consecutive sheets from the second image forming apparatus to the post processing apparatus is maintained at a fixed time interval.

8. The control method according to claim 7, wherein, in order to maintain the first sheet interval at the fixed interval for the plurality of sheets conveyed continuously from the second image forming apparatus to the post processing apparatus, the tandem type image forming apparatus makes a sheet of the plurality of sheets wait in the second image forming apparatus, and thereafter, conveys the sheet to the post processing apparatus.

9. The control method according to claim 7, wherein when the second sheet of the plurality of sheets conveyed continuously is conveyed from the first image forming apparatus to the second image forming apparatus, the tandem type image forming apparatus shortens the second sheet interval relative to the first sheet interval.

10. The control method according to claim 7, wherein in a case where a sheet interval between a first sheet conveyed from the first image forming apparatus to the second image forming apparatus and a sheet preceding the first sheet becomes longer than the first sheet interval, the tandem type image forming apparatus shortens the second sheet interval between the first sheet and a second sheet succeeding the first sheet relative to the first sheet interval.

11. The control method according to claim 7, wherein the tandem type image forming apparatus changes the second sheet interval in accordance with a paper kind of a sheet conveyed from the first image forming apparatus to the second image forming apparatus or an amount of use of rollers of the first image forming apparatus.

12. The control method according to claim 7, wherein the second sheet interval is longer than a shortest interval capable of guaranteeing sheet conveyance in the first image forming apparatus and in the second image forming apparatus.

13. A tandem type image forming system comprising:
a first image forming apparatus;
a second image forming apparatus connected in series to the first image forming apparatus and located on a downstream side in a sheet conveyance direction with respect to the first image forming apparatus; and
a post processing apparatus located on a downstream side in a sheet conveyance direction with respect to the second image forming apparatus,
wherein, in response to a delay that occurs when conveying a sheet from the first image forming apparatus to the second image forming apparatus, the tandem type image forming system shortens a second sheet interval when conveying a plurality of consecutive sheets from the first image forming apparatus to the second image forming apparatus so that a first sheet interval when conveying the sheets from the second image forming apparatus to the post processing apparatus is maintained at a fixed time interval.

14. The tandem type image forming system according to claim 1, wherein the second sheet interval is the time from when a conveyance of one sheet of the plurality of sheets in a registrator of the first image forming apparatus is started to when the conveyance of a further sheet in the registrator of the first image forming apparatus is started, the further sheet directly succeeding the one sheet.

* * * * *